(12) United States Patent
Hoffmuller et al.

(10) Patent No.: US 8,534,710 B2
(45) Date of Patent: Sep. 17, 2013

(54) SECURITY ELEMENT AND METHOD FOR MANUFACTURING THE SAME

(75) Inventors: Winfried Hoffmuller, Bad Tolz (DE); Marius Dichtl, Munich (DE); Stefan Bichlmeier, Unterhaching (DE); Lars Hoffmann, Freising (DE); Manfred Heim, Bad Tolz (DE)

(73) Assignee: Giesecke & Devrient GmbH, Munich (DE)

( * ) Notice: Subject to any disclaimer, the term of this patent is extended or adjusted under 35 U.S.C. 154(b) by 190 days.

(21) Appl. No.: 13/002,117

(22) PCT Filed: Jul. 2, 2009

(86) PCT No.: PCT/EP2009/004768
§ 371 (c)(1),
(2), (4) Date: Dec. 30, 2010

(87) PCT Pub. No.: WO2010/000470
PCT Pub. Date: Jan. 7, 2010

(65) Prior Publication Data
US 2011/0095518 A1 Apr. 28, 2011

(30) Foreign Application Priority Data
Jul. 2, 2008 (DE) .......................... 10 2008 031 325

(51) Int. Cl.
*B42D 15/00* (2006.01)
(52) U.S. Cl.
USPC .............................................. 283/91; 283/94
(58) Field of Classification Search
USPC ...................................................... 283/91, 94
See application file for complete search history.

(56) References Cited

U.S. PATENT DOCUMENTS

| | | | |
|---|---|---|---|
| 3,858,977 A | 1/1975 | Baird et al. | |
| 7,667,894 B2 | 2/2010 | Hoffmuller | |
| 7,728,931 B2 | 6/2010 | Hoffmuller | |
| 7,808,605 B2 | 10/2010 | Hoffmuller | |

(Continued)

FOREIGN PATENT DOCUMENTS

| EP | 1023499 B1 | 5/2004 |
|---|---|---|
| EP | 1833034 A1 | 9/2007 |

(Continued)

OTHER PUBLICATIONS

International Search Report, International Application No. PCT/EP2009/004768, 2 pages, Dec. 9, 2009.

(Continued)

*Primary Examiner* — Kyle Grabowski
(74) *Attorney, Agent, or Firm* — Lathrop & Gage LLP

(57) ABSTRACT

A security element for securing valuable articles comprises an optically variable layer (18) that conveys different color impressions at different viewing angles, and a color-constant layer (17, 24). The optically variable layer (18) and the color-constant layer (17, 24) are stacked in a covering region (20), while at most one of the optically variable layer (18) and the color-constant layer (17, 24) is present outside (22) the covering region. The color impression of the stacked layers (18, 17, 24) in the covering region (20) and the color impression of the one layer (18) outside (22) the covering region are matched with each other when viewed at a predetermined viewing angle. Further, the color-constant layer comprises an ink layer (17) and a metal layer arranged below the ink layer (24).

35 Claims, 5 Drawing Sheets

(56) References Cited

U.S. PATENT DOCUMENTS

Figure 1:
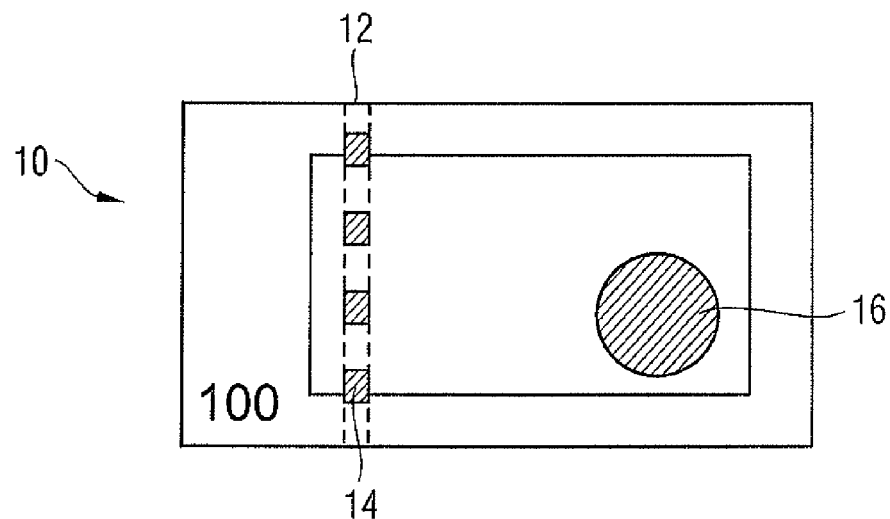

| Number | Date | Name |
|---|---|---|
| 7,986,459 B2 | 7/2011 | Kaule |
| 8,083,894 B2 | 12/2011 | Gruszczynski |
| 8,149,511 B2 | 4/2012 | Kaule |
| 2007/0165182 A1 | 7/2007 | Hoffmuller et al. |
| 2007/0211238 A1 | 9/2007 | Hoffmuller et al. |
| 2007/0216518 A1 | 9/2007 | Hoffmuller |
| 2007/0229928 A1 | 10/2007 | Hoffmuller et al. |
| 2007/0241553 A1* | 10/2007 | Heim et al. .................. 283/91 |
| 2007/0246933 A1 | 10/2007 | Heim et al. |
| 2007/0274559 A1 | 11/2007 | Depta et al. |
| 2008/0014378 A1 | 1/2008 | Hoffmuller et al. |
| 2008/0054621 A1* | 3/2008 | Burchard et al. ............ 283/72 |
| 2008/0079257 A1 | 4/2008 | Fessl |
| 2008/0088859 A1 | 4/2008 | Depta et al. |
| 2008/0129036 A1* | 6/2008 | Seki et al. ................... 283/94 |
| 2008/0160226 A1 | 7/2008 | Kaule et al. |
| 2008/0163994 A1 | 7/2008 | Hoppe et al. |
| 2008/0198468 A1 | 8/2008 | Kaule et al. |
| 2008/0216976 A1 | 9/2008 | Ruck et al. |
| 2008/0250954 A1 | 10/2008 | Depta et al. |
| 2008/0258456 A1 | 10/2008 | Rahm et al. |
| 2009/0001709 A1 | 1/2009 | Kretschmar et al. |
| 2009/0008923 A1 | 1/2009 | Kaule et al. |
| 2009/0008926 A1 | 1/2009 | Depta et al. |
| 2009/0102605 A1 | 4/2009 | Kaule |
| 2009/0115185 A1 | 5/2009 | Hoffmuller et al. |
| 2009/0236061 A1 | 9/2009 | Gruszczynski et al. |
| 2009/0297805 A1 | 12/2009 | Dichtl et al. |
| 2009/0322071 A1 | 12/2009 | Dichtl |
| 2010/0175843 A1 | 7/2010 | Gregarek |
| 2010/0177094 A1 | 7/2010 | Kaule et al. |
| 2010/0182221 A1 | 7/2010 | Kaule et al. |
| 2010/0194091 A1 | 8/2010 | Heim et al. |
| 2010/0194532 A1 | 8/2010 | Kaule |
| 2010/0196587 A1 | 8/2010 | Keller |
| 2010/0207376 A1 | 8/2010 | Heim et al. |
| 2010/0208036 A1 | 8/2010 | Kaule |
| 2010/0231846 A1* | 9/2010 | Commander et al. ........ 283/91 |
| 2010/0307705 A1 | 12/2010 | Rahm et al. |
| 2010/0308570 A1 | 12/2010 | Heim |
| 2010/0320742 A1 | 12/2010 | Hoffmuller et al. |
| 2011/0007374 A1 | 1/2011 | Heim |
| 2011/0012337 A1 | 1/2011 | Heim |
| 2011/0027538 A1 | 2/2011 | Hoffmann et al. |
| 2011/0045248 A1 | 2/2011 | Hoffmuller et al. |
| 2011/0069360 A1 | 3/2011 | Dichtl et al. |
| 2011/0079997 A1 | 4/2011 | Heim |
| 2011/0091665 A1 | 4/2011 | Heim |
| 2011/0095518 A1 | 4/2011 | Hoffmuller et al. |
| 2011/0101670 A1 | 5/2011 | Heim |
| 2011/0109078 A1 | 5/2011 | Hoffmuller et al. |
| 2011/0114733 A1 | 5/2011 | Heim |
| 2011/0157183 A1 | 6/2011 | Kaule et al. |
| 2012/0126525 A1 | 5/2012 | Dorfler |
| 2012/0168515 A1 | 7/2012 | Schutzmann et al. |
| 2012/0170124 A1 | 7/2012 | Fuhse et al. |

FOREIGN PATENT DOCUMENTS

| | | |
|---|---|---|
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006/040069 A1 | 4/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |
| WO | WO 2007/138293 A2 | 12/2007 |
| WO | WO 2008/000350 | 1/2008 |
| WO | WO 2008/000351 | 1/2008 |
| WO | WO 2008/049533 | 5/2008 |
| WO | WO 2008/061636 | 5/2008 |
| WO | WO 2008/071325 | 6/2008 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/012893 | 1/2009 |
| WO | WO 2009/024265 | 2/2009 |
| WO | WO 2009/066048 A1 | 5/2009 |
| WO | WO 2009/080262 | 7/2009 |
| WO | WO 2009/080263 | 7/2009 |
| WO | WO 2009/083146 | 7/2009 |
| WO | WO 2009/083151 | 7/2009 |
| WO | WO 2009/100831 | 8/2009 |
| WO | WO 2009/100869 | 8/2009 |
| WO | WO 2009/109291 | 9/2009 |
| WO | WO 2009/121578 | 10/2009 |
| WO | WO 2009/149831 | 12/2009 |
| WO | WO 2009/149833 | 12/2009 |
| WO | WO 2009/156079 | 12/2009 |
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

International Preliminary Report on Patentability, International Application No. PCT/EP2009/004768, 5 pages, Jan. 18, 2011, English Translation.

\* cited by examiner

SECURITY ELEMENT AND METHOD FOR MANUFACTURING THE SAME

CROSS-REFERENCE TO RELATED APPLICATIONS

This application is the U.S. National Stage of International Application No. PCT/EP2009/004768, filed Jul. 2, 2009, which claims the benefit of German Patent Application DE 10 2008 031 325.4, filed Jul. 2, 2008; both of which are hereby incorporated by reference to the extent not inconsistent with the disclosure herewith.

The present invention relates to a security element for securing valuable articles, having an optically variable layer that conveys different color impressions at different viewing angles. The present invention further relates to a method for manufacturing such a security element, a transfer element, a security paper and a valuable article having such a security element.

For protection, valuable articles such as branded articles and value documents are often furnished with security elements that permit the authenticity of the valuable article to be verified, and that simultaneously serve as protection against unauthorized reproduction. Valuable articles within the meaning of the present invention include especially banknotes, stocks, bonds, certificates, vouchers, checks, valuable admission tickets and other papers that are at risk of counterfeiting, such as passports and other identity documents, as well as product protection elements, such as labels, seals, packaging and the like. In the following, the term "valuable article" encompasses all such articles, documents and product protection means.

The security elements can be developed, for example, in the form of a security thread embedded in a banknote, an applied security strip or a self-supporting transfer element, such as a patch or a label that, after its manufacture, is applied to a value document.

To prevent reproduction of the security elements even with top-quality color copiers, the security elements frequently exhibit optically variable elements that, from different viewing angles, convey to the viewer a different image impression and display, for example, a different color impression or different graphic motifs.

In this connection, it is known to use security elements having multilayer thin-film elements in which the color impression for the viewer changes with the viewing angle, and when the security feature is tilted, shifts for example from green to blue, from blue to magenta or from magenta to green. Such color changes when a security element is tilted are referred to in the following as a color-shift effect.

U.S. Pat. No. 3,858,977 describes such optical interference coatings having a color-shift effect in connection with security elements. Depending on the type and number of layers in the layer structure, two or more different, viewing-angle-dependent color effects can occur.

In publication EP 1 833 034 A1, an identification element is described in which an optically variable layer formed by cholesteric liquid crystals is arranged contiguously over an ink layer. However, the color impression of this ink layer is not really fixed and the design freedom of the identification element is limited. In other known security elements, the ink layer often appears too dark.

It is one object of the present invention to solve the above-mentioned problems and especially to improve a security element of the kind mentioned above in that the color impression produced by the ink layer is sufficiently light and especially remains as stable as possible in different viewing conditions.

This object is solved by the security element having the features of the main claim. A manufacturing method for the security element, a transfer element, a security paper and a valuable article having such a security element are specified in the coordinated claims. Developments of the present invention are the subject of the dependent claims.

According to the present invention, a security element for securing valuable articles includes
  an optically variable layer that conveys different color impressions at different viewing angles, and a color-constant layer,
  the optically variable layer and the color-constant layer being stacked in a covering region, while at most one of the optically variable layer and the color-constant layer is present outside the covering region,
  the color impression of the stacked layers in the covering region and the color impression of the one layer outside the covering region being matched with each other when viewed at a predetermined viewing angle, and
  the color-constant layer comprising an ink layer and a metal layer arranged below the ink layer.

According to a first advantageous variant of the present invention, here, a security element for securing valuable articles is provided with an optically variable layer. The optically variable layer conveys different color impressions at different viewing angles. Further, the security element comprises an ink layer arranged over the optically variable layer in a covering region, the color impression of the optically variable layer in a region not covered by the ink layer being matched with the color impression of the ink layer in the covering region when viewed at a predetermined viewing angle. A metal layer is arranged between the ink layer and the optically variable layer.

According to a second, likewise advantageous variant of the present invention, in the covering region, the optically variable layer is arranged over the ink layer of the color-constant layer.

In the layer sequence of the security element according to the present invention, the terms "over", "under", "above" and "below" each refer to the viewing direction for which the security element is designed. As also depicted in the drawings, the security elements according to the present invention are designed for viewing from above. Therefore, a layer lies over another layer when it lies closer to the eye of the viewer when viewed from above. To see a layer that lies further below, the viewer must look through gaps in a layer that lies further above.

Furthermore, according to the present invention, a transfer element for application to a security paper, value document or the like is furnished with such a security element. Furthermore, according to the present invention, a security paper for manufacturing security or value documents, such as banknotes, checks, identification cards, certificates and the like is provided that is furnished with such a security element. Furthermore, according to the present invention, a valuable article, such as a branded article, value document or the like, is furnished with such a security element.

Furthermore, according to the present invention, a method for manufacturing a security element for securing valuable articles is provided, in which
  the optically variable layer and the color-constant layer are stacked in a covering region, while at most one of the optically variable layer and the color-constant layer is arranged outside the covering region, the color impression of the stacked layers in the covering region and the color impression of the one layer outside the covering region being matched with each other when viewed at a predetermined viewing angle, and the color-constant layer is formed from an ink layer and a metal layer arranged below the ink layer.

In an advantageous variant of the method, it is provided that the ink layer of the color-constant layer is arranged in the covering region over the optically variable layer, the color impression of the optically variable layer outside the covering region being matched with the color impression of the ink layer in the covering region when viewed at a predetermined viewing angle, and the metal layer of the color-constant layer being arranged between the ink layer and the optically variable layer.

According to another, likewise advantageous variant of the method, in the covering region, the optically variable layer is arranged over the ink layer of the color-constant layer.

The ink layer according to the first variant of the present invention, arranged in the covering region over the optically variable layer, or the visible ink layer according to the second variant of the present invention, in the region not covered by the optically variable layer, each constitutes a color-constant region. The color impression of the ink layer does not change or changes only marginally when viewed at the different viewing angles. In the respective adjoining region of the optically variable layer, on the other hand, the color impression changes for the viewer depending on the viewing angle. Here, the optically variable layer is configured such that at least two different color impressions are created at the different viewing angles.

When the security element is viewed at a predetermined viewing angle, the color impression of the optically variable layer is matched with the color impression of the ink layer. In particular, the color impression of the optically variable layer at this viewing angle is matched with the color impression of the ink layer in such a way that, for the viewer, the two color impressions appear identical. Here, with respect to the layer sequence ink layer—metal layer of the color-constant layer, the viewing of the security element expediently occurs from the side of the ink layer, so with the convention used in the present application, from above.

The inventive combination of the optically variable layer with the ink layer has an optically attractive effect, is self-explanatory for the user and, furthermore, exhibits a high counterfeit security. The immediate proximity of the color-variable region and the color-constant region intensifies the optical conspicuousness and thus directs the viewer's attention to the security element. Here, the color-constant region simultaneously forms a visually stabilizing influence and a point of comparison for the color-variable region in the authenticity check. A combination of the two color effects in immediate proximity impedes reproduction of the security element, since freely available inks or foils having color-shift effects can no longer be used directly. If the ink layer is arranged over the optically variable layer, the light reflected by the ink layer does not, as in known security elements, first pass through the optically variable layer, and as a result, the color impression of the ink layer remains highly stable under different viewing conditions.

Through the inventive arrangement of a metal layer below the ink layer, a loss of light is prevented. Light portions that, upon illumination of the ink layer, are not reflected by same, but rather penetrate the ink layer, are reflected by the metal layer and thus amplify the brightness of the color impression of the ink layer for the viewer. In this way, light losses are minimized through the inventive arrangement of the metal layer. This applies especially when the ink layer is developed as a semitransparent ink layer. Through the metal layer according to the present invention, it is thus prevented that the ink layer appears to be too dark for the viewer, and as a result, especially the matching of the color impression of the ink layer with the color impression of the optically variable layer when viewed at the predetermined viewing angle can be improved.

As already mentioned above, the ink layer can, in one embodiment according to the present invention, be designed as a semitransparent ink layer. Compared with the use of an opaque ink layer, the use of a semitransparent ink layer effects a significantly stronger adaptation of the color impressions of the optically variable layer and of the covering region at the predetermined viewing angles. In particular, unavoidable color fluctuations in the optically variable layer can be detected within a production series, and the brilliance and the sheen in the covering region adapted to the high values typical for optically variable layers. In a preferred embodiment, the semitransparent ink layer exhibits a transmittance between 60% and 95%, particularly preferably between 80% and 95%. The semitransparent ink layer is advantageously formed with soluble dye or well dispersed pigment.

The semitransparent ink layer can be applied in different ways, it is advantageously imprinted on the metal layer or a plastic substrate, for example in the screen printing method. The semitransparent ink layer can be designed, for example, as a screened ink layer. Such a screened ink layer can exhibit a negative grating, a positive grating or a line grating.

To introduce additional features into the security element, in preferred embodiments, the semitransparent ink layer is present in the form of characters, patterns or codes. The semitransparent ink layer can also exhibit gaps in the form of characters, patterns or codes.

It is possible to achieve a particularly appealing effect if the optically variable layer and the ink layer are coordinated with each other in such a way that, when the security element is viewed vertically, the color impression of the optically variable layer corresponds substantially to the color impression of the ink layer. Here, in the first variant of the present invention, the color impression of the optically variable layer appears outside the covering region, and the color impression of the ink layer lying on top, in the covering region, while in the second variant of the present invention, the color impression of the optically variable layer lying on top appears in the covering region, and the color impression of the ink layer, outside the covering region. In this way, when viewed vertically, which often occurs when a security element applied to a valuable article is first perceived, the color-variable and the color-constant region first convey substantially the same color impression. When the security element is tilted, the color impression changes in the color-variable region, while it remains unchanged in the color-constant covering region.

In the first variant of the present invention, in one embodiment of the present invention, the metal layer in the covering region immediately adjoins the ink layer. The ink layer is thus arranged immediately over the metal layer. In this way, it is achieved that light that penetrates the ink layer is reflected back to the ink layer with particularly high efficiency. Further, it is advantageous when the metal layer in the covering region immediately adjoins the optically variable layer, that is, in the covering region, the metal layer is arranged immediately over the optically variable layer. In this way, the transition between the covering region and the adjoining region, not covered by the ink layer, of the optically variable layer is designed to be as optically inconspicuous as possible. In a preferred embodiment according to the present invention, in the covering region, the optically variable layer, the metal layer and the ink layer are immediately consecutive layers of a sandwich structure. Advantageously, regions of the optically variable layer that are not covered by the ink layer are also not covered by the metal layer.

In both variants of the present invention, the optically variable layer can consist of a single layer. In this case, the optically variable layer preferably exhibits liquid crystal material, especially cholesteric liquid crystal material. In one embodiment, the optically variable layer is designed completely from liquid crystal material. The liquid crystal material is preferably present as a liquid crystal polymer material or in the form of pigments embedded in a binder matrix.

The person of skill in the art knows the mode of action of cholesteric liquid crystals, for example from EP 1 833 034 A1. In one embodiment of a cholesteric liquid crystal layer described therein, said layer exhibits multiple stacked levels in which, in each case, the liquid crystals are aligned identically. The orientation of the liquid crystals varies stepwise from level to level, and does so in such a way that a three-dimensional spiral-shaped overall structure results. This is marked by a vertical period length P within which the orientation of the liquid crystals rotates 360°. Circularly polarized light having a predetermined rotation direction and an average wavelength $\lambda S$ is reflected by the liquid crystal layer if the light satisfies the equation $\lambda S = n \times P$, where n is the refractive index of the liquid crystal layer. Linearly polarized light, in contrast, is transmitted by the liquid crystal layer. The effective period length P changes depending on the viewing angle. With it, also the average wavelength $\lambda S$ of the reflected light changes, and thus the color impression of the liquid crystal layer depending on the viewing angle. In this way, a cholesteric liquid crystal layer can, for example, appear red when viewed vertically, while the color impression changes to orange, yellow, green, blue-green and blue when the viewing angle changes.

In a further variant of the present invention, the optically variable layer consists of multiple sub-layers. In this variant, the optically variable layer is formed by a thin-film element having a color-shift effect. Here, the thin-film element preferably includes a reflection layer, an absorber layer and a dielectric spacing layer arranged between the reflection layer and the absorber layer. In such thin-film elements, the color-shift effect is based on viewing-angle-dependent interference effects that are caused by multiple reflections in the different sub-layers of the element. The path difference of the light reflected at the different layers depends, on one hand, on the optical thickness of the dielectric spacing layer, which determines the distance between the absorber layer and the reflection layer, and on the other hand, it varies with the respective viewing angle.

Since the path difference is on the order of the wavelength of visible light, due to destructive interference and amplification of certain wavelengths, an angle-dependent color impression results for the viewer. Through suitable choice of material and thickness of the dielectric spacing layer, a number of different color-shift effects can be designed, for example tilt effects, in which the color impression changes with the viewing angle from green to blue, from blue to magenta or from magenta to green. The reflection layer of the thin-film element is preferably formed by an opaque or by a semitransparent metal layer. As the reflection layer, a layer that is magnetic at least in some regions can be used, such that a further authenticity feature can be integrated without requiring an additional layer in the layer structure.

The reflection layer can also exhibit gaps in the form of patterns, characters or codes that form transparent or semi-transparent regions in the thin-film element. In the transparent or semitransparent gap regions, the viewer is presented with a conspicuous contrast to the surrounding color-shift effect. In particular, the patterns, characters or codes can light up brightly in transmitted light when the thin-film element is applied to a transparent substrate.

The dielectric spacing layer can be developed to be partially absorbent and is preferably formed by a printing layer or by an ultrathin foil, especially a stretched polyester foil.

Alternatively or in addition to gaps in the reflection layer, also the absorber layer and/or the spacing layer can exhibit gaps in the form of patterns, characters or codes. No color-shift effect occurs in the gap regions of the absorber layer or of the spacing layer.

In an advantageous embodiment, the thin-film element includes at least two absorber layers and at least two dielectric spacing layers, the absorber layers and the dielectric spacing layers being stacked alternatingly. In a further variant, the thin-film element includes multiple dielectric spacing layers, adjoining layers of the dielectric spacing layers exhibiting widely different refractive indices; the refractive indices of the adjoining dielectric spacing layers differ by at least 0.03.

In a further variant, the optically variable layer consists of a layer that includes the thin-film elements having a color-shift effect in the form of pigments. The optically variable layer is preferably imprinted, said layer including the pigments in a transparent binder.

In the first variant of the present invention, in a further embodiment of the present invention, a protective layer is arranged between the optically variable layer and the metal layer. This protective layer can be formed, for example, by a clear lacquer. In this way, the optically variable layer can be effectively protected against mechanical influences. In this case, the metal layer does not immediately adjoin the optically variable layer in the covering region. Rather, the two layers are separated by the protective layer.

In a further embodiment according to the present invention, a diffractive embossing pattern is embossed in the optically variable layer. The diffractive embossing pattern is preferably designed as an embossed hologram. It is thus possible to realize so-called color-shift holograms, for example, in which the color-shift effect of the optically variable layer is combined with a holographic effect.

The diffractive embossing pattern is preferably embossed in an optically variable layer surface that faces the metal layer. Advantageously, the diffractive embossing pattern extends across the entire surface of the security element and thus both in the covering region and in regions of the optically variable layer that are not covered by the metal layer or the ink layer. Through the embossing of the diffractive embossing pattern in an optically variable layer surface that faces the metal layer, the topography of the embossing pattern is pushed through the metal layer and, if applicable, the ink layer arranged thereon, and a relief corresponding to the embossing pattern thus produced in the metal layer. In this way, the diffractive effect of the embossing pattern on incident light is effected by means of the relief produced in the metal layer. In an advantageous embodiment, the diffractive embossing pattern forms a grating image for depicting a true color image that exhibits a plurality of true color areas that luminesce in a desired true color when the grating image is illuminated.

In a further embodiment according to the present invention, the security element exhibits a substrate that bears the optically variable layer. This substrate can especially be formed by a carrier foil composed of plastic, for example by a transparent PET foil.

In a further embodiment according to the present invention, a further ink layer that has an absorbent effect is arranged between the substrate and the optically variable layer. Alternatively, such an absorbent ink layer can be arranged on a substrate side that faces away in relation to the optically variable layer. In this case, the optically variable layer is then preferably arranged immediately on the substrate.

In a further advantageous embodiment according to the present invention, the substrate and the ink layer that covers the optically variable layer are arranged on the same side with respect to the optically variable layer. Preferably, the substrate is arranged in such a way that it covers the ink layer. In this way, the substrate can, for example, be applied immediately to the ink layer.

In a further embodiment according to the present invention, a metal layer that is not covered by the ink layer and that is especially covered by a transparent resist coating is arranged in a further covering region over the optically variable layer. This makes an interesting design variant possible in which the security element exhibits three different color regions, namely a region characterized by the ink layer, a region characterized by the optically variable layer, and a region that is characterized by the metal layer. According to an interesting manufacturing variant, the metal layer is first applied to the optically variable layer. After that, the ink layer is applied to a first covering region and the transparent resist coating to a further covering region. After that, an etching demetalization of the surface occurs, which leads to the metal layer being removed only in the region that is covered neither by the ink layer nor by the transparent resist. The result is a security element having the above-mentioned three color regions.

In the second variant of the present invention, the optically variable layer and the color-constant layer are preferably arranged on opposing sides of a transparent or translucent substrate. The ink layer can be formed by a colored printing layer or also by a colored resist coating layer.

Over the optically variable layer can be applied, in both variants of the present invention, a patterned, transparent layer that changes the exit angle of the light reflected by the optically variable layer. The patterned layer consists especially of a series of parallel linear microprisms or a grid arrangement composed of square pyramids, tetrahedrons or cube-corner structures, the individual elements each exhibiting a size or a period interval in the range from 1 µm up to 150 µm.

Here, the microprisms, pyramids, tetrahedrons or cube-corner structures produce a plurality of small facets in the patterned layer. The presence of the patterned layer then leads to light that, without the patterned layer, would be reflected internally in the optically variable layer due to its flat angle of incidence, striking one of the facets of the patterned layer at a steeper angle and being able to leave the security element. In this way, the reflected color region of the optically variable layer can be expanded, as explained in greater detail below. Further details on the functional principle and the possible embodiments of the patterned layer can be found in publication WO 2009/066048 A1, whose disclosure is incorporated in the present application by reference.

In both variants of the present invention, the security element is preferably a security thread, a security band, a security strip, a patch, a label or another transfer element for application to a security paper, value document or the like.

In an advantageous embodiment of the method according to the present invention, the ink layer is developed as a resist coating. According to the embodiment, the metal layer is first developed through contiguous metalization of the optically variable layer, and after that, the ink layer is applied to the metal layer in at least the covering region. Thereafter, the metal layer is removed through etching demetalization in a region not covered by the ink layer. Since the ink layer is developed as a resist coating, the ink layer protects the metalization in the covering region during the etching step, through which the inventive metal layer between the ink layer and the optically variable layer is preserved.

In a further embodiment according to the present invention, before the arrangement of the ink layer over the optically variable layer in the covering region, a washable ink is arranged on the optically variable layer outside the covering region. After that, the optically variable layer with the washable ink arranged thereon is contiguously metalized to develop the metal layer, and the ink layer is contiguously applied to the metal layer. Thereafter, by means of a washing liquid that penetrates the ink layer, the washable ink is washed out in such a way that, in the region of the washable ink, the ink layer is removed together with the metal layer. Preferably, the ink layer is imprinted on the metal layer. As regards details on the embodiment of the demetalization by means of the washable ink, reference can be made, for example, to EP 1 023 499 B1.

In a further embodiment according to the present invention, the optically variable layer is formed by liquid crystal material, and a diffractive embossing pattern is embossed in the liquid crystal material. The liquid crystal material is preferably precrosslinked before the embossing of the embossing pattern, and postcrosslinked after the embossing process. The postcrosslinking can occur, for example, by means of UV irradiation. Alternatively to precrosslinking before the embossing, an embossing die used for the embossing can exhibit so-called alignment-capable patterns that are superimposed on the embossing pattern. Such alignment-capable patterns ensure that an alignment of the liquid crystals occurs upon embossing. In particular, it is advantageous when the embossing die undergoes a suitable surface treatment that leads to a crosslinking of the liquid crystals occurring during the embossing.

In a further embodiment according to the present invention, before the embossing of the diffractive embossing pattern in the liquid crystal material, a substrate is provided with an absorbent ink layer. After that, the absorbent ink layer is prepatterned and coated with the liquid crystal material. Upon application of the liquid crystals to the prepatterned ink layer, the liquid crystals undergo an alignment, through which a precrosslinking of the liquid crystals occurs. A postcrosslinking step advantageously occurs after the embossing of the diffractive embossing pattern.

The prepatterning of the absorbent ink layer can occur, according to the present invention, through a rubbing of the ink layer with a material and/or through a suitable exposure of the ink layer.

In a further embodiment according to the present invention, the substrate is coated with a liquid crystal material that forms the optically variable layer. Further, an absorbent ink layer is imprinted on a side of the substrate opposing this coating. After the coating, the diffractive embossing pattern is embossed in the liquid crystal material.

In a further advantageous embodiment according to the present invention, the optically variable layer is transferred to a substrate, such as a carrier foil, before the embossing of the diffractive embossing pattern. In this way, the dimensional stability of the optically variable layer during the embossing process is ensured, and a tearing of the optically variable layer, for example, prevented.

In a further embodiment, after the arrangement of the metal layer and the ink layer on the optically variable layer, the optically variable layer is applied to the ink-layer side of a substrate. In this case, the security element should be viewed from the substrate side. In this embodiment, the security element is particularly protected by the substrate against soiling or damage.

For all embodiments and examples of security elements according to the present invention applies that the security element can be chopped up, e.g. punched, and processed as a pigment. It is possible to further process the pigments into e.g. printing inks.

The features specified with respect to the above-listed embodiments of the security element according to the present invention can be transferred accordingly to the manufacturing method according to the present invention, and vice versa.

Further exemplary embodiments and advantages of the present invention are explained below by reference to the attached schematic drawings, in which a depiction to scale and proportion was dispensed with in order to improve their clarity.

Figure 2:
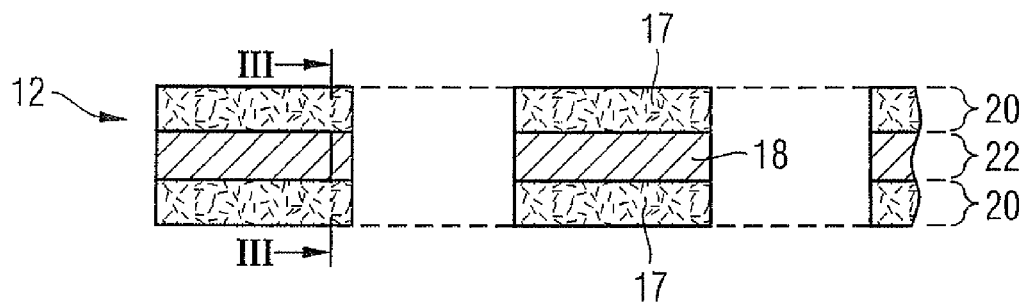
Figure 3:
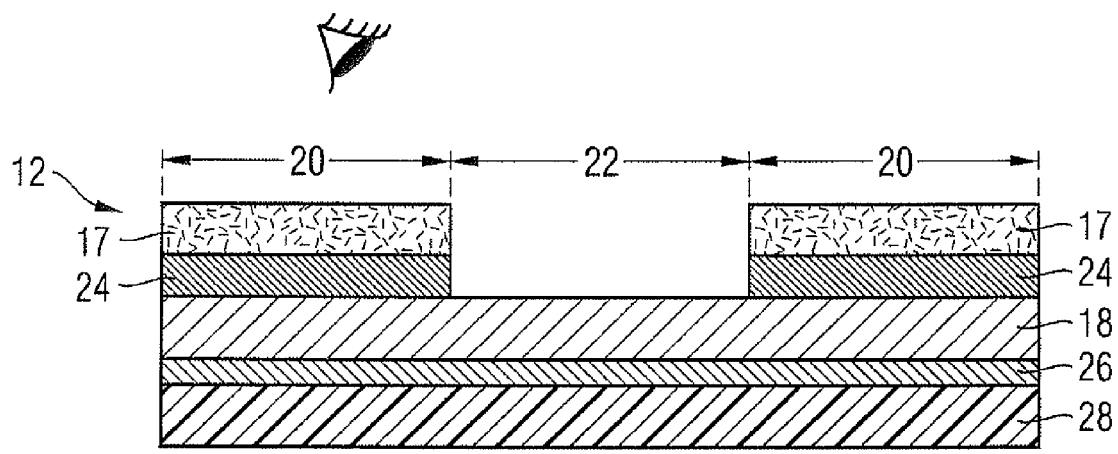
Figure 4:
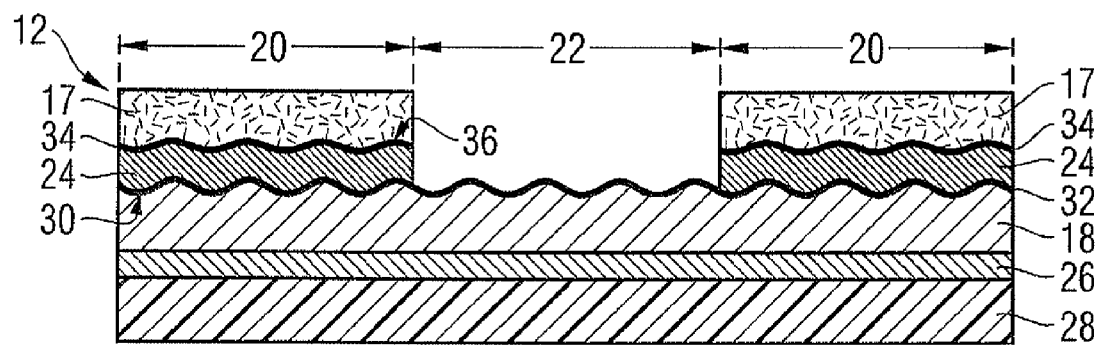
Figure 5:
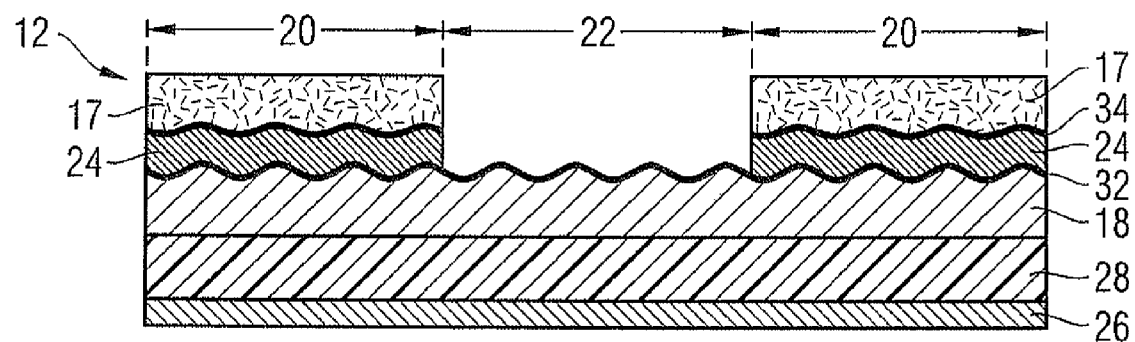
Figure 6:
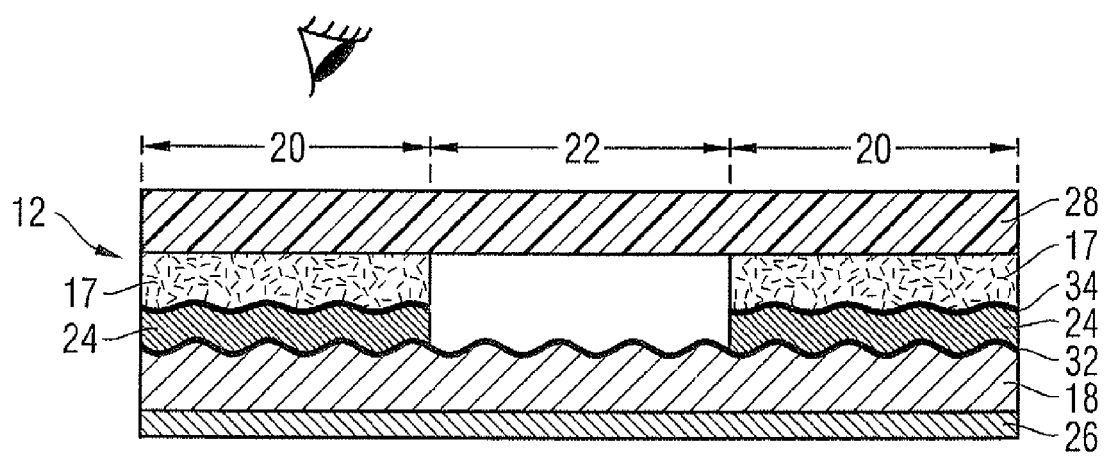
Figure 7:
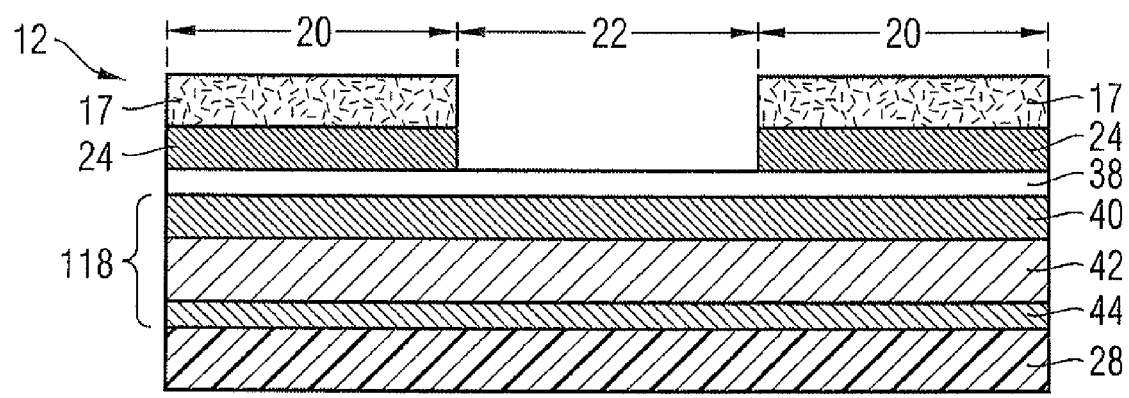
Figure 8A:
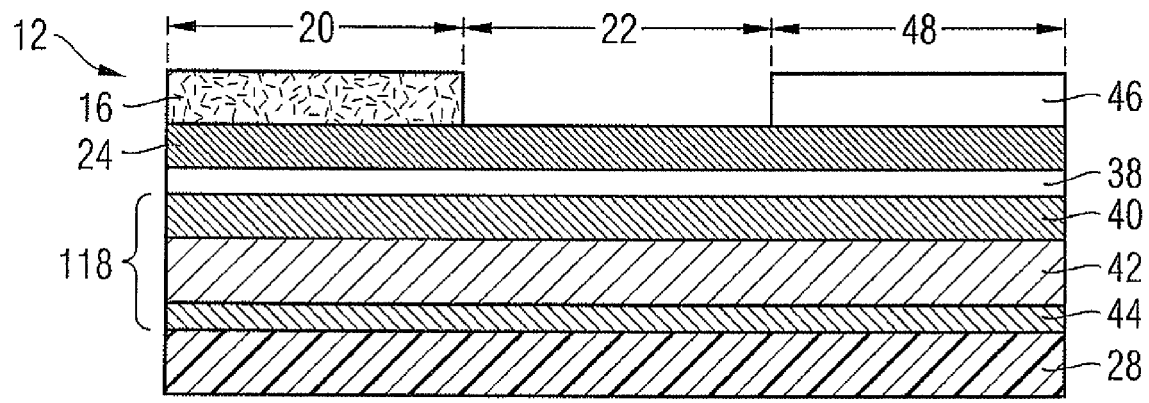
Figure 8B:
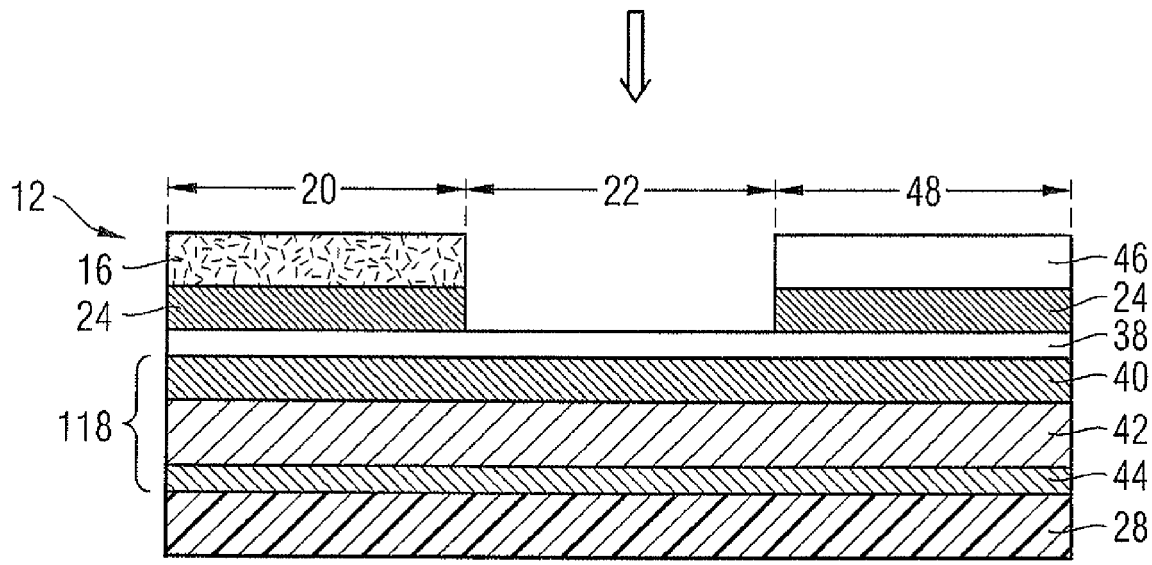
Figure 9:
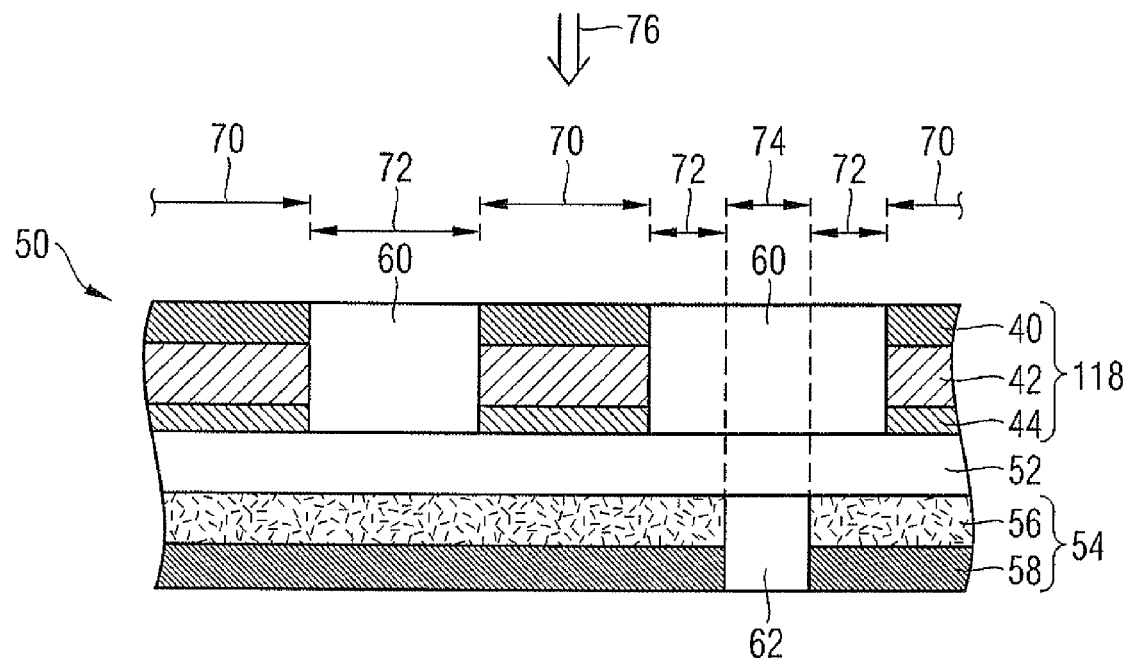
Figure 10:
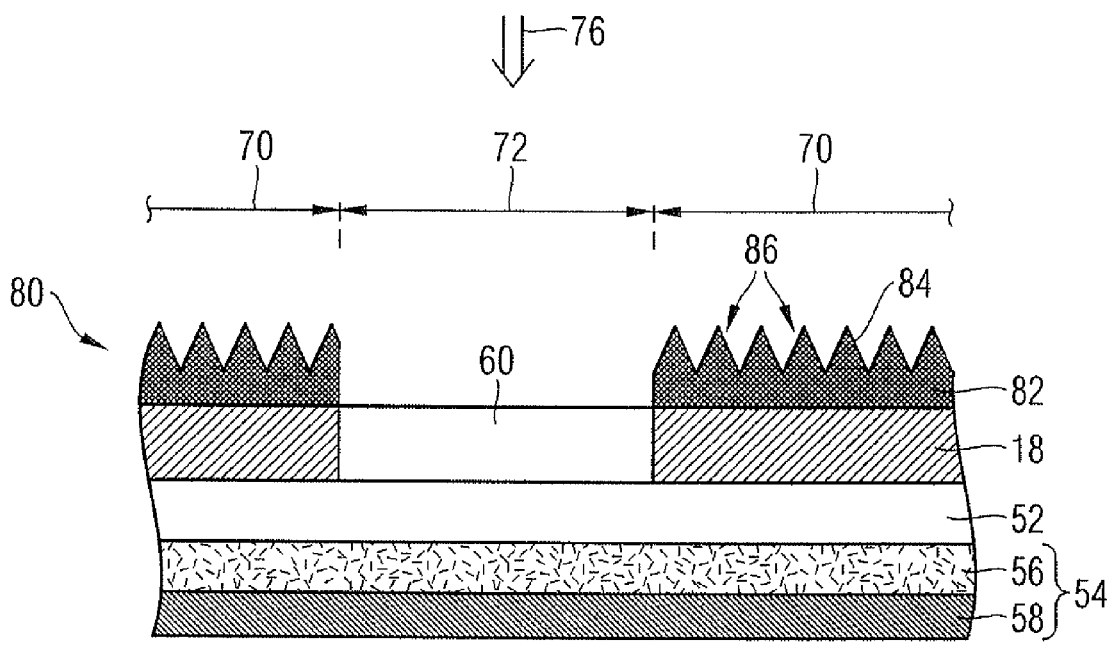

Shown are:

FIG. 1 a schematic diagram of a banknote having an embedded security thread according to the present invention and an affixed transfer element according to the present invention, FIG. 2 a top view of a sub-region of the security thread in FIG. 1 in a first embodiment according to the present invention, FIG. 3 a cross section through the security thread in FIG. 2 along the line III-III, FIG. 4 a second embodiment of the security thread according to the present invention, in cross section, FIG. 5 a third embodiment of the security thread according to the present invention, in cross section, FIG. 6 a fourth embodiment of the security thread according to the present invention, in cross section, FIG. 7 a fifth embodiment of the security thread according to the present invention, in cross section, FIG. 8 an illustration of the manufacture of a sixth embodiment of the security thread according to the present invention, with FIG. 8*a* showing the security thread in a state during the manufacture, and FIG. 8*b*, the security thread in the end state, FIG. 9 a security element according to another exemplary embodiment of the present invention, in cross section, and FIG. 10 a security element according to a further exemplary embodiment of the present invention, in cross section.

In the exemplary embodiments described below, elements that are functionally or structurally similar to each other are, as far as possible, marked with the same or similar reference signs. Thus, to understand the features of the individual elements of a certain exemplary embodiment, reference should be made to the description of other exemplary embodiments or the general description of the present invention.

The invention will now be explained in greater detail using a banknote as an example. For this, FIG. 1 shows a schematic diagram of a banknote 10 having two security elements 12 and 16, each of which is formed according to an exemplary embodiment of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. In the following, the structure of the security thread 12 in different embodiments according to the present invention is explained. The transfer element 16 can be developed analogously to these embodiments.

The structure of the security thread 12 in a first embodiment is explained in greater detail with reference to FIGS. 2 and 3. Here, FIG. 2 shows a top view of a sub-region of the security thread 12, and FIG. 3 depicts a cross section through the security thread 12 along the line III-III in FIG. 2.

As evident from FIG. 3, the security thread 12 comprises a substrate 28 that serves as a carrier layer in the form of a transparent carrier foil that can be developed e.g. as a PET foil. The substrate 28 is coated with an absorbent ink layer 26. Thereon is located an optically variable layer in the form of a cholesteric liquid crystal layer 18. The liquid crystal layer 18 is designed to produce a color-shift effect, that is, at different viewing angles, the liquid crystal layer 18 conveys different color impressions. About the functional principle of the cholesteric liquid crystal layer, reference is made to EP 1833034 A1 and the above explanations.

Sections of the security thread 12 form covering regions 20, in each of which a semitransparent ink layer 17 is arranged over the liquid crystal layer 18. Between the liquid crystal layer 18 and the semitransparent ink layer 17 is arranged, in each case, a metal layer 24. In the uncovered region 22 immediately adjoining the covering regions 20, the liquid crystal layer 18 is free from the ink layer 17 and the metal layer 24.

The liquid crystal layer 18 and the ink layer 17, together with the metal layer 24 arranged thereunder, are coordinated with each other in such a way that they evoke substantially the same color impression at a vertical viewing angle. The color impression of the liquid crystal layer 18 at a vertical viewing angle is also referred to in the following as the vertical tilt color.

When the security thread 12 is tilted, the color impression of the liquid crystal layer 18 in the uncovered region 22 changes, while the color impression in the covering regions 20 remains unchanged. Through such a combination of a color-variable region with a color-constant region in immediate proximity, the visual conspicuousness of the color-shift effect is even significantly amplified, since the human eye reacts more strongly to the color differences that occur than to the color change per se. The viewer's attention is thus drawn even more strongly to the security feature. Furthermore, the mode of action of the security element is self-explanatory such that it can easily be checked for authenticity by anyone without further effort.

The combination of a steadily colored element with a color-shift element is generally perceived to be optically very appealing. For potential counterfeiters, the combination of the two color effects in immediate proximity means a significant impedance to reproduction, since freely available inks or foils having color-shift effects can no longer be used directly.

Through the arrangement of the metal layer 24 under the respective semitransparent ink layer 17, light that penetrates the ink layer 17 is reflected back to the ink layer 17 again. This leads to the light loss upon viewing the ink layer 17 being minimized and the ink layer 17 thus appearing lighter. The matching of the color impression and especially the brilliance of the ink layers 17 to the color impression or the brilliance of the liquid crystal layer 18 in the uncovered region 22 is thus improved.

At manufacture of the security thread 12 according to FIGS. 2 and 3, in one embodiment, the substrate 28 is first coated with the absorbent ink layer 26. After that, the cholesteric liquid crystal layer 18 is transferred contiguously onto the coated substrate 28. Thereafter, the cholesteric liquid crystal layer 18 is contiguously metalized. On the metalization is printed a motif in the desired fixed color 17, which is developed as a resist coating.

After that, an etching demetalization occurs. In this way, the liquid crystal layer 18 is exposed again in regions that are not covered by the ink layer 22. After that, a further processing, e.g. with heat seal layers, magnet, reverse-side metalization, luminescent inks, etc., can occur without particular requirements.

FIG. 4 shows the security thread 12 in a further embodiment according to the present invention. This embodiment differs from the embodiment shown in FIGS. 2 and 3 in that a micropattern in the form of a diffractive embossing pattern 32 is embossed in the surface 30, facing the viewer or the metal layer 24, of the liquid crystal layer 18, for example to produce a hologram pattern. The diffractive embossing pattern 32 leads to a relief pattern in the surface 30 of the liquid crystal layer 18. This relief pattern in the surface 30 leads to a corresponding relief 34 at the surface 36, of the metal layer 24, that adjoins the ink layer 17. In this way, the diffractive embossing pattern 30 facilitates a continuous depiction of further optical patterns, such as the above-mentioned hologram patterns, for the viewer. In the covering regions 20, the metal layer 24 functions in each case as a reflector for such holograms. In the uncovered region 22, the liquid crystal layer 18 serves as a reflector. For this, the liquid crystal layer 18 exhibits, in the region of the embossing pattern 32, a certain alignment, that is, the liquid crystals exhibit a preferred direction with respect to their orientation.

The alignment can occur through a precrosslinking of the liquid crystal layer 18 before the embossing of the same. According to an alternative manufacturing method according to the present invention, first the substrate 28 is coated with the absorbent ink layer 26, thereafter, the absorbent ink layer 26 is prepatterned and the liquid crystal layer 18 applied to the prepatterned ink layer 26. The absorbent ink layer 26 then acts as an alignment layer for the liquid crystals in the liquid crystal layer 18. Furthermore, also yet a further layer can be provided that, together with the absorbent ink layer 18, ensures the alignment of the liquid crystals. The prepatterning of the absorbent ink layer 26 can occur, for example, through a rubbing with a material, such as velvet, or with brushes or through a suitable exposure. After the application of the liquid crystal layer 18 to the substrate 28, the liquid crystal layer 18 is precrosslinked, embossed and, if needed, also postcrosslinked.

The postcrosslinking can occur, for example, by means of UV irradiation.

FIG. 5 shows a further embodiment of the security thread 12 according to the present invention. This differs from the embodiment according to FIG. 4 only in that the absorbent ink layer 26 is imprinted, not between the liquid crystal layer 18 and the substrate 28, but rather on the underside of the substrate 28, that is, the side of the substrate 28 facing away from the liquid crystal layer 18.

At manufacture of the security thread 12 according to FIG. 5, the substrate is first prepatterned for the alignment of the liquid crystals. After that, it is coated with the liquid crystal layer 18, precrosslinked if applicable, embossed and postcrosslinked by means of UV irradiation. The process of the mechanical embossing and of the subsequent postcrosslinking or curing by means of UV irradiation is also referred to as UV embossing. Due to the fact that, during the UV embossing, the absorbent ink layer 26 is not yet present, improved UV irradiation results are achieved. After that, the absorbent ink layer in the form of a usually black background is subsequently printed on the reverse of the substrate 28.

FIG. 6 shows a further embodiment of the security thread 12 according to the present invention. This embodiment differs from the embodiment according to FIG. 5 in that the substrate 28 is applied on the viewing side of the security thread 12. Here, the substrate 28 is applied directly to the ink layer 17. The absorbent ink layer 26 is imprinted on the liquid crystal layer 18 from below.

At manufacture of the security thread 12 according to FIG. 6, the liquid crystal layer 18 is first applied to an alignment-capable carrier foil, not shown in FIG. 6, that can be executed to be identical to the substrate 28. After that, the diffractive embossing pattern 32 is, as described above, embossed in the liquid crystal layer 18, the liquid crystal layer 18 thereafter contiguously metalized and the ink layer 17 applied in the respective covering regions 20. Thereafter, an etching demetalization is carried out and the layer arrangement transferred to a substrate 28.

After that, the alignment-capable foil is detached from the liquid crystal layer 18 and the absorbent ink layer 26 printed on the liquid crystal layer 18 from below. With the embodiment according to FIG. 6, possible problems arising due to an insufficient adhesiveness of the liquid crystal layer 18 to the substrate 28 are avoided.

In a further inventive embodiment of the manufacturing method of the security thread 12, the liquid crystal layer 18 is not precrosslinked before the embossing of the embossing pattern 32. For this, the embossing die used for embossing bears alignment-capable patterns that are superimposed on the diffractive embossing pattern so that, in the embossing process, liquid crystals that are located near the embossing pattern undergo an alignment. In addition, a suitable surface treatment of the embossing die can favor the alignment of the liquid crystals. In this case, the main crosslinking of the liquid crystal layer 18 occurs during the embossing. This can occur, for example, through electron beam curing or by means of UV light. If the curing occurs in the region of the embossing die, the otherwise common inertization of the liquid crystals becomes unnecessary due to an exclusion of oxygen that commonly occurs upon embossing.

FIG. 7 shows a further embodiment of a security thread 12 according to the present invention. It differs from the security thread 12 according to FIG. 3 in that the optically variable layer is formed, in this case, by a thin-film element 118 rather than by means of a liquid crystal layer 18. The thin-film element 118 is arranged directly on the substrate 28, that is, without an absorbent ink layer 26 arranged therebetween. The thin-film element 118 is sealed at its top side with an easily metalizable layer in the form of a clear lacquer 38.

On this is arranged, in the covering regions 20, the combination of metal layer 24 and ink layer 17 already known from the preceding embodiments. The thin-film element 118 according to FIG. 7 likewise produces, like the liquid crystal layer 18 according to the above-explained embodiments, a color-shift effect. For this, the optically variable thin-film element 118 comprises a reflection layer 44 formed by an opaque aluminum layer, an ultrathin $SiO_2$ spacing layer 42 applied to the reflection layer 44, and a semitransparent absorber layer 40 composed of chrome. As explained above, the color-shift effect of the thin-film element 118 is based on interference effects due to multiple reflections in the different sub-layers 44, 42 and 40 of the element 118.

FIG. 8*b* shows a further variant of a security element 12 according to the present invention having a thin-film element 118 as the optically variable layer. The security thread 12 according to FIG. 8*b* differs from the embodiment according to FIG. 7 in that, in addition to the covering region 20, a further covering region 48 is provided in which the thin-film element 118 is covered, not by the ink layer 17, but rather by a colorless resist coating 46. A metal layer 24 is arranged between the colorless resist coating 46 and the thin-film element 118.

FIG. 8a illustrates the manufacture of the security thread 12 according to FIG. 8b. After the contiguous metalization of the thin-film element 118, the metal layer 24 is partially printed on with the ink layer 17 and partially with the colorless resist coating 46. In the subsequent etching demetalization, the metal layer 24 is protected in the covering region 48 by the resist coating 46, such that, as a result, three color regions are produced on the security thread 12. These comprise the color of the ink layer 17 in the covering region 20, the color of the optically variable layer 118 in the uncovered region 22 and the color of the metal layer 22 in the further covering region 48.

Alternatively to the above-described etching demetalization, the metal layer 24 in the uncovered region 22 can also be removed by using a washable ink, following the method described in EP 1 023 499 B1. Here, before the arrangement of the ink layer 17 over the optically variable layer 18 or 118 in the covering region 20, a washable ink is arranged on the optically variable layer 18 or 118 in the uncovered region 22, and after that, the optically variable layer 18 or 118 having the washable ink arranged thereon is completely metalized to develop the metal layer 24, and the ink layer 17 contiguously applied to the metal layer 24.

After that, by means of a washing liquid that penetrates the ink layer 17, the washable ink is washed out in such a way that, in the region of the washable ink, the ink layer 17 is removed together with the metal layer 24. In this application, the ink layer 17 should be formulated to be so porous that an influx of the washing liquid to the washable ink is possible.

In the exemplary embodiments described thus far, the color-constant layer is arranged over the optically variable layer in the covering region such that, from bottom to top, the layer sequence optically variable layer—metal layer—ink layer results. Here, the viewing occurs from above, so from the side of the ink layer of the layer sequence. Also further layers can lie between the cited layers, as already explained above.

In other embodiments according to the present invention, in the covering region, the optically variable layer is arranged over the ink layer of the color-constant layer such that, from bottom to top, the layer sequence metal layer—ink layer—optically variable layer results. Here, too, the viewing occurs from above, so from the side of the optically variable layer of the layer sequence. Further layers can lie between the cited layers, and the optically variable layer and the color-constant layer can especially be arranged on opposing sides of a transparent or translucent substrate.

For this, FIG. 9 shows an exemplary embodiment of a security element 50 according to the present invention, having a transparent PET substrate 52 that bears, on opposing sides, a color-constant layer 54 and an optically variable layer 118. In the exemplary embodiment, the optically variable layer is formed by a thin-film element 118, of the kind already described in connection with FIG. 7, that includes an aluminum reflection layer 44, an ultrathin $SiO_2$ spacing layer 42 and a partially transparent absorber layer 40 composed of chrome.

The color-constant layer 54 is formed by an ink layer 56 imprinted on the substrate 52, for example with a soluble dye or a well dispersed pigment, and an aluminum layer 58 arranged below the ink layer 56. The ink layer 56 and aluminum layer 58 can also be manufactured on a separate carrier and transferred to the substrate 52.

In the exemplary embodiment, both the thin-film element 118 and the color-constant layer 54 are provided with gaps 60 or 62, through which three regions 70, 72, 74 having a different visual appearance are created.

In a first region 70, the covering region, the thin-film element 118 is arranged over the color-constant layer 54. There, the viewer perceives, upon viewing from above (arrow 76) only the optically variable appearance of the thin-film element 118.

The regions 72 in which the thin-film element 118 exhibits gaps 60, in which, however, no gaps are present in the color-constant layer 54, form the uncovered region 72 in which the viewer perceives, from direction 76, the color-constant color of the ink layer 56.

Here, the metal layer 58 that, from the viewing direction 76, lies under the ink layer 56 reflects the light that penetrates the ink layer 56, and in this way, increases its brightness and brilliance. The thin-film element 118 and the color-constant layer 54 are coordinated with each other in such a way that they produce, for a predetermined viewing angle, for example for vertical viewing 76, substantially the same color impression. Through the metal layer 58 arranged below the ink layer 56 it is possible to match not only the tone, but also the metallic sheen of the color-constant layer 54 to the visual impression of the thin-film element 118.

Since the reflected light of the optically variable layer does not pass through the color-constant layer, its color constancy is particularly high. Also a particularly good adaptation of the color impression of the optically variable layer 118 and the color-constant layer 54 can be achieved.

In the regions 74 in which gaps 60 in the thin-film element and gaps 62 in the color-constant layer 54 are stacked, the security element 50 exhibits clear see-through regions. Here, the see-through regions 74 are developed in the form of patterns, characters or a code, for example in the form of a microtext.

The security element 80 in FIG. 10 shows an exemplary embodiment that, in the covering regions 70, from bottom to top, likewise exhibits a layer sequence metal layer 58—ink layer 56—optically variable layer 18, the metal layer 58 and the ink layer 56 together forming a color-constant layer 54.

The color-constant layer 54 and the optically variable layer 18 are arranged on opposing sides of a transparent PET substrate 52. The optically variable layer can especially be a liquid crystal layer or a thin-film element. Gaps 60 in the optically variable layer define the regions 72 that lie outside the covering region, in which the viewer perceives the color-constant layer 54 from the direction 76.

Over the optically variable layer 18 is applied a patterned, transparent layer 82 that changes the exit angle of the light reflected by the optically variable layer and that, in the exemplary embodiment, consists of a series of parallel linear microprisms 84 of a size of about 30 μm.

Here, the microprisms produce a plurality of small facets 86 in the patterned layer 82 that permit the light that, due to its flat angle of incidence, is otherwise reflected internally in the optically variable layer 18, to leave the security element.

In this way, the reflected color region of the optically variable layer is expanded. For example, in an optically variable layer 18 having a color-shift effect that ranges from red when viewed vertically to green when viewed obliquely, blue light is normally reflected internally in the layer 18 such that, in reflection, this light does not contribute to the visual impression. However, the patterned layer 82 applied to the optically variable layer 18 makes it possible also for the blue light to leave the security element 80. At the same time, the longer wavelengths are broken toward the surface normal.

The color-shift effect of the security element 80 having a patterned layer 82 then ranges from red when viewed vertically to green when viewed semi-obliquely to blue when viewed obliquely. Further details on the functional principle and the possible embodiments of the patterned layer 82 can be found in publication WO 2009/066048 A1, whose disclosure is incorporated in the present application by reference.

The invention claimed is:

1. A security element for securing valuable articles, having an optically variable layer that conveys different color impressions at different viewing angles, and a color-constant layer,
the optically variable layer and the color-constant layer being stacked in a covering region, while at most one of the optically variable layer and the color-constant layer is present outside the covering region,
the color impression of the stacked layers in the covering region and the color impression of the one layer outside the covering region being matched with each other when viewed at a predetermined viewing angle, and
the color-constant layer comprising an ink layer and a metal layer arranged below the ink layer;
wherein the ink layer of the color-constant layer is arranged in the covering region over the optically variable layer, the color impression of the optically variable layer in the region not covered by the ink layer being matched with the color impression of the ink layer in the covering region when viewed at a predetermined viewing angle, and the metal layer of the color-constant layer being arranged between the ink layer and the optically variable layer.

2. The security element according to claim 1, characterized in that the metal layer in the covering region immediately adjoins the ink layer.

3. The security element according to claim 1, characterized in that the metal layer in the covering region immediately adjoins the optically variable layer.

4. The security element according to claim 1, characterized in that a protective layer is arranged between the optically variable layer and the metal layer.

5. The security element according to claim 1, characterized in that a diffractive embossing pattern is embossed in the optically variable layer.

6. The security element according to claim 5, characterized in that the diffractive embossing pattern is embossed in an optically variable layer surface that faces the metal layer.

7. The security element according to claim 1, characterized in that the security element exhibits a substrate that bears the optically variable layer.

8. The security element according to claim 7, characterized in that a further ink layer that has an absorbent effect is arranged between the substrate and the optically variable layer.

9. The security element according to claim 7, characterized in that a further ink layer that has an absorbent effect is arranged on a side of the substrate that faces away with respect to the optically variable layer.

10. The security element according to claim 7, characterized in that the substrate and the ink layer that covers the optically variable layer are arranged on the same side with respect to the optically variable layer.

11. The security element according to claim 1, characterized in that a metal layer that is not covered by the ink layer and that is especially covered by a transparent resist coating is arranged in a further covering region over the optically variable layer.

12. The security element according to claim 1, characterized in that, in the covering region, the optically variable layer is arranged over the ink layer of the color-constant layer.

13. The security element according to claim 12, characterized in that the optically variable layer and the color-constant layer are arranged on opposing sides of a transparent or translucent substrate.

14. The security element according to claim 12, characterized in that the ink layer of the color-constant layer is formed by a colored resist coating layer.

15. The security element according to claim 1, characterized in that the optically variable layer exhibits liquid crystal material, especially cholesteric liquid crystal material.

16. The security element according to claim 1, characterized in that the optically variable layer is formed by a thin-film element having a color-shift effect.

17. The security element according to claim 1, characterized in that the ink layer of the color-constant layer is semi-transparent, preferably having a transmittance between 60% and 95%, particularly preferably between 80% and 95%.

18. The security element according to claim 1, characterized in that the security element is designed as a security thread, security band, security strip, patch or label for application to a security paper or value document.

19. A transfer element for application to a security paper or value document having the security element according to claim 1.

20. A security paper for manufacturing security or value documents, such as banknotes, checks, identification cards, or certificates, having the security element according to claim 1 or a transfer element having the security element according to claim 1.

21. A valuable article, such as a branded article or value document having the security element according to claim 1 or a transfer element having the security element according to claim 1.

22. A method for manufacturing the security element for securing valuable articles according to claim 1, in which
the optically variable layer and the color-constant layer are stacked in a covering region, while at most one of the optically variable layer and the color-constant layer is arranged outside the covering region,
the color impression of the stacked layers in the covering region and the color impression of the one layer outside the covering region being matched with each other when viewed at a predetermined viewing angle, and
the color-constant layer is formed from an ink layer and a metal layer arranged below the ink layer;
wherein the ink layer of the color-constant layer is arranged in the covering region over the optically variable layer, the color impression of the optically variable layer outside the covering region being matched with the color impression of the ink layer in the covering region when viewed at a predetermined viewing angle, and the metal layer of the color-constant layer being arranged between the ink layer and the optically variable layer.

23. The method according to claim 22, characterized in that the ink layer is developed as a resist coating and in that, after a development of the metal layer through contiguous metalization of the optically variable layer, the ink layer is applied to the metal layer in at least the covering region, and the metal layer is removed through etching demetalization in a region not covered by the ink layer.

24. The method according to claim 22, characterized in that, before the arrangement of the ink layer over the optically variable layer in the covering region, a washable ink is arranged on the optically variable layer outside the covering region, the optically variable layer having the washable ink arranged on it is contiguously metalized to develop the metal layer, the ink layer is contiguously applied to the metal layer, and by means of a washing liquid that penetrates the ink layer, the washable ink is washed out in such a way that, in the region of the washable ink, the ink layer is removed together with the metal layer.

25. The method according to claim 22, characterized in that the optically variable layer is formed by liquid crystal material, and in that a diffractive embossing pattern is embossed in the liquid crystal material.

26. The method according to claim 25, characterized in that, before the embossing of the diffractive embossing pattern in the liquid crystal material, a substrate is provided with an absorbent ink layer, the absorbent ink layer is prepatterned, and the prepatterned ink layer is coated with the liquid crystal material.

27. The method according to claim 26, characterized in that the prepatterning of the ink layer occurs through a rubbing of the ink layer with a material and/or through a suitable exposure of the ink layer.

28. The method according to claim 25, characterized in that the liquid crystal material is precrosslinked before the embossing and postcrosslinked after the embossing.

29. The method according to claim 25, characterized in that the liquid crystal material is embossed with an embossing die that exhibits alignment-capable patterns that are superimposed on the embossing pattern structure, and a crosslinking of the liquid crystal material occurs during the embossing.

30. The method according to claim 25, characterized in that the optically variable layer is transferred to a substrate before the embossing of the diffractive embossing pattern.

31. The method according to claim 22, characterized in that the optically variable layer is applied to a substrate on the side of the ink layer after the arrangement of the metal layer and the ink layer thereon.

32. The method according to claim 22 that is configured to manufacture the security element.

33. The method according to claim 22, characterized in that, in the covering region, the optically variable layer is arranged over the ink layer of the color-constant layer.

34. The method according to claim 33, characterized in that the optically variable layer and the color-constant layer are arranged on opposing sides of a transparent or translucent substrate.

35. The method according to claim 22 that is configured to manufacture the security element.

* * * * *